US007664089B2

(12) United States Patent
Zhao

(10) Patent No.: US 7,664,089 B2
(45) Date of Patent: Feb. 16, 2010

(54) SYSTEM AND METHOD FOR USING AN ADAPTIVE HYBRID COORDINATION FUNCTION (HCF) IN AN 802.11E WIRELESS LAN

(75) Inventor: Yun Zhao, Irvine, CA (US)

(73) Assignee: Hitachi Ltd., Tokyo (JP)

(*) Notice: Subject to any disclaimer, the term of this patent is extended or adjusted under 35 U.S.C. 154(b) by 551 days.

(21) Appl. No.: 11/653,159

(22) Filed: Jan. 12, 2007

(65) Prior Publication Data
US 2008/0171550 A1 Jul. 17, 2008

(51) Int. Cl.
H04W 4/00 (2009.01)
H04L 12/413 (2006.01)

(52) U.S. Cl. .................. 370/338; 370/447

(58) Field of Classification Search ........ 370/230–235.1, 370/252, 253, 328–329, 338, 420, 443–448, 370/461–462; 709/220–221, 223–225, 231–233; 710/29, 36, 58
See application file for complete search history.

(56) References Cited

U.S. PATENT DOCUMENTS

| | | | |
|---|---|---|---|
| 6,747,968 B1 | 6/2004 | Seppälä et al. | |
| 6,791,996 B1* | 9/2004 | Watanabe et al. | 370/447 |
| 6,965,942 B1* | 11/2005 | Young et al. | 709/232 |
| 6,990,116 B1* | 1/2006 | Young et al. | 370/445 |
| 7,027,465 B2 | 4/2006 | Hautala | |
| 7,054,329 B2* | 5/2006 | Cervello et al. | 370/447 |
| 2001/0024434 A1* | 9/2001 | Ayyagari et al. | 370/347 |
| 2002/0110085 A1* | 8/2002 | Ho et al. | 370/230 |
| 2002/0163928 A1 | 11/2002 | Rudnick et al. | |
| 2003/0081628 A1* | 5/2003 | Sugar et al. | 370/461 |
| 2003/0091066 A1* | 5/2003 | Choi et al. | 370/468 |
| 2004/0004973 A1* | 1/2004 | Lee | 370/445 |
| 2004/0071154 A1* | 4/2004 | Wentink | 370/448 |
| 2004/0100936 A1* | 5/2004 | Liu et al. | 370/345 |
| 2004/0114562 A1* | 6/2004 | Kim | 370/338 |
| 2004/0117497 A1 | 6/2004 | Park | |
| 2004/0160930 A1 | 8/2004 | Choi | |
| 2005/0058151 A1* | 3/2005 | Yeh | 370/445 |
| 2005/0141480 A1* | 6/2005 | Jin et al. | 370/351 |
| 2005/0281225 A1 | 12/2005 | Mishra | |
| 2006/0045051 A1 | 3/2006 | Floros | |

(Continued)

OTHER PUBLICATIONS

T. Godfrey, "Inside 802.11e: Making QoS a Reality over WLAN Connections", CommsDesign, http://www.us.design-reuse.com/articles/?id=6865&print=yes; Oct. 12, 2006, 11 pages.

(Continued)

Primary Examiner—Aung S Moe
Assistant Examiner—Redentor M Pasia
(74) Attorney, Agent, or Firm—Mattingly & Malur, P.C.

(57) ABSTRACT

A system comprises a network congestion monitoring module for monitoring a congestion-related metric of a wireless medium, the congestion-related metric being based on traffic class, e.g., average contention window; a contention-period/contention-free-period (CP/CFP) adaptation module coupled to the network congestion monitoring module for generating CP/CFP information, e.g., CP/CFP duration information and/or traffic class shifting information, in response to the at least one congestion-related metric; a point coordinator module coupled to the CP/CFP adaptation module for coordinating access to the wireless medium using a point coordination function, e.g., HCCA, based on the CP/CFP information; and a distributed coordinator module coupled to the CP/CFP adaptation module for coordinating access to the wireless medium using a distributed coordination function, e.g., EDCA, based on the CP/CFP information.

19 Claims, 8 Drawing Sheets

U.S. PATENT DOCUMENTS

| | | | |
|---|---|---|---|
| 2006/0050742 A1* | 3/2006 | Grandhi et al. | 370/506 |
| 2006/0114878 A1* | 6/2006 | Choe et al. | 370/346 |
| 2006/0146874 A1* | 7/2006 | Yuan et al. | 370/468 |
| 2008/0095124 A1* | 4/2008 | Ramos et al. | 370/336 |

OTHER PUBLICATIONS

C. Consani, "Work In Progress: Quality Of Service Of IEEE 802.11e", http://pubs.cs.uct.ac.za/archive/00000149/01/No_206_-Consani.pdf#search=%22Work%20In%20Progress%3A%20Quality%20of%20Service%20of%20IEEE%20802.11e%22, 2 pages.

IEEE 802 "Part 11: Wireless Medium Access Control (MAC) and Physical Layer (PHY) Specifications, Amendment 8: Medium Access Control (MAC) Enhancements for Quality of Service (QoS)", *IEEE Std.802.11e*, Nov. 2005.

* cited by examiner

Default EDCA AC Parameter Set for 802.11g

| AC | CWmin | CWmax | AIFSN | TXOP limit (ms) |
|---|---|---|---|---|
| (1) AC_BK | 15 | 1023 | 7 | 0 |
| (0) AC_BE | 15 | 1023 | 3 | 0 |
| (2) AC_VI | 7 | 15 | 2 | 3.008 |
| (3) AC_VO | 3 | 7 | 2 | 1.504 |

☐ CAP
▨ EDCA TXOPs AND ACCESS BY LEGACY STAs USING DCF

SYSTEM AND METHOD FOR USING AN ADAPTIVE HYBRID COORDINATION FUNCTION (HCF) IN AN 802.11E WIRELESS LAN

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to wireless local area networks, and more particularly provides a system and method for using an adaptive hybrid coordination function (HCF) in a wireless local area network.

BACKGROUND

As users experience the convenience of wireless connectivity, they are demanding increasing support. Typical applications over wireless networks include video streaming, video conferencing, distance learning, etc. Because wireless bandwidth availability is restricted, quality of service (QoS) management is increasingly important in 802.11 networks.

The original 802.11 media access control (MAC) protocol was designed with two modes of communication for wireless stations. The first mode, Distributed Coordination Function (DCF), is based on Carrier Sense Multiple Access with Collision Avoidance (CSMA/CA), sometimes referred to as "listen before talk." A wireless station (STA) waits for a quiet period on the network and then begins to transmit data and detect collisions. The second mode, Point Coordination Function (PCF), supports time-sensitive traffic flows. Using PCF, wireless access points (APs) periodically send beacon frames to communicate network identification and management parameters specific to the wireless local area network (WLAN). Between beacon frames, PCF splits time into a contention period (CP) where the STAs implement a DCF protocol, and a contention-free period (CFP) where an AP coordinates access by the various STAs based on QoS requirements.

Because DCF and PCF do not differentiate between traffic types or sources, IEEE proposed enhancements to both coordination modes to facilitate QoS. These changes are intended to fulfill critical service requirements while maintaining backward-compatibility with current 802.11 standards.

Enhanced Distributed Channel Access (EDCA) introduces the concept of traffic categories. Using EDCA, STAs try to send data after detecting that the wireless medium is idle for a set time period defined by the corresponding traffic category. A higher-priority traffic category will have a shorter wait time than a lower-priority traffic category. While no guarantees of service are provided, EDCA establishes a probabilistic priority mechanism to allocate bandwidth based on traffic categories.

The IEEE 802.11e EDCA standard provides QoS differentiation by grouping traffic into four access classes (ACs), i.e. voice, video, best effort and background. Each transmission frame from the upper layers bears a priority value (0-7), which is passed down to the MAC layer. Based on the priority value, the transmission frames are mapped into the four ACs at the MAC layer. The voice (VO) AC has the highest priority; the video (VI) AC has the second highest priority; the best effort (BE) AC has the third highest priority; and the background (BK) AC has the lowest priority. Each AC has its own transmission queue and its own set of medium access parameters. Traffic prioritization uses the medium access parameters—the arbitration interframe space (AIFS) interval, contention window (CW, CWmin and CWmax), and transmission opportunity (TXOP)—to ensure that a higher priority AC has relatively more medium access opportunity than a lower priority AC.

Generally, in EDCA, AIFS is the time interval that a STA must sense the wireless medium to be idle before invoking a backoff mechanism or transmission. A higher priority AC uses a smaller AIFS interval. The contention window (CW, CWmin and CWmax) indicates the number of backoff time slots until the STA can attempt another transmission. The contention window is selected as a random backoff number of slots between 0 and CW. CW starts at CWmin. CW is essentially doubled every time a transmission fails until CW reaches its maximum value CWmax. Then, CW maintains this maximum value until the transmission exceeds a retry limit. A higher priority AC uses smaller CWmin and CWmax. A lower priority AC uses larger CWmin and CWmax. TXOP indicates the maximum duration that an AC can be allowed to transmit transmission frames after acquiring access to the medium. To save contention overhead, multiple transmission frames can be transmitted within one acquired TXOP without additional contention, as long as the total transmission time does not exceed the TXOP duration.

To reduce the probability of two STAs colliding, because the two STAs cannot hear each other, the standard defines a virtual carrier sense mechanism. Before a STA initiates a transaction, the STA first transmits a short control frame called RTS (Request To Send), which includes the source address, the destination address and the duration of the upcoming transaction (i.e. the data frame and the respective ACK). Then, the destination STA responds (if the medium is free) with a responsive control frame called CTS (Clear to Send), which includes the same duration information. All STAs receiving either the RTS and/or the CTS set a virtual carrier sense indicator, i.e., the network allocation vector (NAV), for the given duration, and use the NAV together with the physical carrier sense when sensing the medium as idle or busy. This mechanism reduces the probability of a collision in the receiver area by a STA that is "hidden" from the transmitter station to the short duration of the RTS transmission, because the STA hears the CTS and "reserves" the medium as busy until the end of the transaction. The duration information in the RTS also protects the transmitter area from collisions during the ACK from STAs that are out of range of the acknowledging station. Due to the fact that the RTS and CTS are short, the mechanism reduces the overhead of collisions, since these transmission frames are recognized more quickly than if the whole data transmission frame was to be transmitted (assuming the data frame is bigger than RTS). The standard allows for short data transmission frames, i.e., those shorter than an RTS Threshold, to be transmitted without the RTS/CTS transaction.

With these medium access parameters, EDCA works in the following manner:

Before a transmitting STA can initiate any transmission, the transmitting STA must first sense the channel idle (physically and virtually) for at least an AIFS time interval. If the channel is idle after an initial AIFS interval, then the transmitting STA initiates an RTS transmission and awaits a CTS transmission from the receiving STA.

If a collision occurs during the RTS transmission or if CTS is not received, then the transmitting STA invokes a backoff procedure using a backoff counter to count down a random number of backoff time slots selected between 0 and CW (initially set to CWmin). The transmitting STA decrements the backoff counter by one as long as the channel is sensed to be idle. If the transmitting STA senses the channel to be busy at any time during the backoff procedure, the transmitting STA suspends its current backoff procedure and freezes its backoff counter until the channel is sensed to be idle for an AIFS interval again. Then, if the channel is still idle, the transmitting STA resumes decrementing its remaining backoff counter.

Once the backoff counter reaches zero, the transmitting STA initiates an RTS transmission and awaits a CTS transmission from the receiving STA. If a collision occurs during the RTS transmission or CTS is not received, then the transmitting STA invokes another backoff procedure, possibly increasing the size of CW. That is, as stated above, after each unsuccessful transmission, CW is essentially doubled until it reaches CWmax. After a successful transmission, CW returns to its default value of CWmin. During the transaction, the STA can initiate multiple frame transmissions without additional contention as long as the total transmission time does not exceed the TXOP duration.

The level of QoS control for each AC is determined by the combination of the medium access parameters and the number of competing STAs in the network. The default EDCA parameter values used by non-AP QoS stations (QSTAs) are identified in FIG. 1A. A TXOP_Limit value of 0 indicates that a single MAC service data unit (MSDU) or MAC protocol data unit (MPDU), in addition to a possible RTS/CTS exchange or CTS to itself, may be transmitted at any rate for each TXOP.

The Hybrid Coordination Function (HCF) is another 802.11e wireless protocol. Generally, HCF uses the concepts of PCF but substitutes the protocols of DCF during the contention period (CP) with the improved protocols of EDCA. Using HCF, a hybrid coordinator (HC), typically co-located with the AP, periodically sends beacon frames. Each beacon frame includes a beacon interval, a timestamp, a service set identifier (SSID) identifying the specific wireless LAN, supported rates, parameter sets identifying implemented signaling protocols (frequency hopping spread spectrum, direct sequence spread spectrum, etc.), capability information identifying communication requirements (WEP, etc.), a traffic indication map (TIM) identifying data frames waiting in the AP's buffer, and a contention-free period (CFP) duration. The AP and STAs use the information in the beacon frames to implement HCF.

Between beacon frames, HCF splits time into a contention-free period (CFP) and a contention period (CP). During the CFP, the AP uses HCF controlled channel access (HCCA) protocols to coordinate access by the various STAs based on QoS requirements. The contention-free period typically begins with the receipt of a beacon frame, and ends either upon expiration of the CFP duration as specified in the beacon frame or upon receiving a CFP-End frame from the HC. During the CP, the AP and STAs use a combination of EDCA and HCCA protocols. Each STA accesses the wireless medium when the wireless medium is determined to be available under EDCA rules or when the STA receives a QoS CF-Poll frame from the HC. In other words, unlike PCF, HCF enables contention-free bursts called controlled access periods (CAPs) during the CP to allow priority traffic to access the wireless medium without contention. At all other times during the CP, the STAs access the wireless medium using EDCA. FIG. 1B is a timing diagram illustrating prior art CAP/CP/CFP intervals. As shown, a CFP Repetition Interval includes both the CFP and CP.

Because of its simplicity and reduced overhead, network designers typically prefer to implement WLANs that use only distributed wireless access, e.g., DCF, EDCA, etc. However, because STAs implementing distributed wireless access seize access to the wireless medium without a coordinator, collisions occur (especially when many STAs are competing for access to a wireless channel). Accordingly, in some ways, WLANs implementing point coordination, e.g., PCF, HCF, etc., may be more reliable and efficient.

Example prior art references include the following:

| | | |
|---|---|---|
| 1. | U.S. Pat. No. 6,747,968 B1 | Seppälä et al. |
| 2. | U.S. Pat. No. 6,990,116 B1 | Young et al. |
| 3. | U.S. Pat. No. 7,027,465 B2 | Hautala |
| 4. | US Patent App. Publ. No. 2002/0163928 A1 | Rudnick et al. |
| 5. | US Patent App. Publ. No. 2004/0117497 A1 | Park |
| 6. | US Patent App. Publ. No. 2004/0160930 A1 | Choi et al. |
| 7. | US Patent App. Publ. No. 2005/0281225 A1 | Mishra et al. |
| 8. | US Patent App. Publ. No. 2006/0045051 A1 | Floros et al. |

9. "Inside 802.11e: Making QoS a Reality over WLAN Connections,"www.us.design -reuse.com/articles/?id=6865&print=yes 10. "Work In Progress: Quality of Service of IEEE 802.11e, "pubs.cs.uct.ac.za/archive/00000149/01/No 206_Consani.pdf#search=%22Work%20In%20Progress%3A%20Qualiiy%20of%20Service%20of%20IEEE@20802.11e%22

SUMMARY

Per one embodiment, the present invention provides a system comprising a network congestion monitoring module for monitoring a congestion-related metric of a wireless medium, the congestion-related metric being based on traffic class, e.g., average contention window; a contention-period/contention-free-period (CP/CFP) adaptation module coupled to the network congestion monitoring module for generating CP/CFP information, e.g., CP/CFP duration information and/or traffic class shifting information, in response to the at least one congestion-related metric; a point coordinator module coupled to the CP/CFP adaptation module for coordinating access to the wireless medium using a point coordination function, e.g., HCCA, based on the CP/CFP information; and a distributed coordinator module coupled to the CP/CFP adaptation module for coordinating access to the wireless medium using a distributed coordination function, e.g., EDCA, based on the CP/CFP information.

The system may include a video distribution system. The CP/CFP adaptation module may control CP/CFP duration, and the CP/CFP information may specify the CP/CFP duration. The CP/CFP adaptation module may control traffic class shifting, and the CP/CFP information may specify at least a portion of at least one traffic class to operate during the CFP. The CP/CFP adaptation module may generate CP/CFP information that specifies shifting voice and video traffic classes to the CFP in response to a predetermined result of a comparison of information based on the congestion-related metric against a predetermined threshold. The CP/CFP adaptation module may generate CP/CFP information that specifies shifting voice and video traffic classes to the CP in response to a predetermined result of a comparison of information corresponding to the congestion-related metric against a predetermined threshold.

Further, the congestion-related metric may include average contention window size per traffic class. The CP/CFP adaptation module may compute a normalized contention-window metric based on the function $$CW\_avg = \frac{[\alpha_1 \cdot CW\_VO + \alpha_2 \cdot CW\_VI]}{[\alpha_3 \cdot CW\_BE + \alpha_4 \cdot CW\_BK]},$$

where CW_VO is the average contention window for voice traffic of substantially all wireless stations in a service set, CW_VI is the average contention window for video traffic of substantially all wireless stations in the service set, CW_BE is the average contention window for best effort traffic of substantially all wireless stations in the service set, CW_BK is the average contention window for background traffic of substantially all wireless stations in the service set, and $\alpha_1, \alpha_2, \alpha_3$ and $\alpha_4$ are weight values based on traffic class. The network congestion monitoring module may monitor a plurality of congestion-related metrics including contention window size and retry count; and the CP/CFP adaptation module may generate a normalized network congestion index (network_congestion_index) from the plurality of network congestion metrics based on the function $$network\_congestion\_index = \\ c_1 \cdot CW\_avg + c_2 \cdot \frac{packet\_error}{MAX\_ERROR} + c_3 \cdot \frac{retry\_number}{MAX\_RETRY\_NUMBER},$$

$$\text{where } \sum_i c_i = 1,$$

$c_i$ is a weight value based on congestion-metric type, packet_error is an averaged number of packet errors from substantially all wireless stations in a service set, retry_number is an averaged retry count from substantially all wireless stations in the service set; MAX_ERROR is a predefined maximum number of packet errors, and MAX_RETRY_NUMBER is a predefined maximum number of retry count. The system may further comprise one or more wireless stations coupled to the wireless medium, each station including a network congestion monitoring agent for monitoring a congestion-related metric of the wireless medium and for transmitting information corresponding to the congestion-related metric to the network congestion monitoring module.

Per another embodiment, the present invention may provide a method comprising monitoring a congestion-related metric of a wireless medium, the congestion-related metric being based on traffic class; generating contention-period/contention-free-period (CP/CFP) information in response to the at least one congestion-related metric; controlling access to the wireless medium using a hybrid coordination function based on the CP/CFP information, the controlling including coordinating access to the wireless medium using a point coordination function based on the CP/CFP information, and coordinating access to the wireless medium using a distributed coordination function based on the CP/CFP information.

The controlling may include controlling CP/CFP duration, and the CP/CFP information specifies the CP/CFP duration. The controlling may include controlling traffic class shifting, and the CP/CFP information may specify at least a portion of at least one traffic class to operate during the CFP. The method may further comprise comparing information based on the congestion-related metric against a predetermined threshold, and the generating may include generating CP/CFP information that specifies shifting voice and video traffic classes to the CFP in response to the comparison. The method may further comprise comparing information based on the congestion-related metric against a predetermined threshold, and the generating may include generating CP/CFP information that specifies shifting voice and video traffic classes to the CP in response to the comparison.

Further, the congestion-related metric may include average contention window size per traffic class. The generating may include computing a normalized contention-window metric based on the function $$CW\_avg = \frac{[\alpha_1 \cdot CW\_VO + \alpha_2 \cdot CW\_VI]}{[\alpha_3 \cdot CW\_BE + \alpha_4 \cdot CW\_BK]},$$

where CW_VO is the average contention window for voice traffic of substantially all wireless stations in a service set, CW_VI is the average contention window for video traffic of substantially all wireless stations in the service set, CW_BE is the average contention window for best effort traffic of substantially all wireless stations in the service set, CW_BK is the average contention window for background traffic of substantially all wireless stations in the service set, and $\alpha_1, \alpha_2, \alpha_3$ and $\alpha_4$ are weight values based on traffic class. The monitoring may include monitoring a plurality of congestion-related metrics including contention window size and retry count; and the generating may include generating a normalized network congestion index from the plurality of congestion-related metrics based on the function $$network\_congestion\_index = \\ c_1 \cdot CW\_avg + c_2 \cdot \frac{packet\_error}{MAX\_ERROR} + c_3 \cdot \frac{retry\_number}{MAX\_RETRY\_NUMBER},$$

where $$\sum_{i o} c_i = 1,$$

$c_i$ is a weight value based on congestion-metric type, packet_error is an averaged number of packet errors from substantially all wireless stations in a service set, retry_number is an averaged retry count from substantially all wireless stations in the service set; MAX_ERROR is a predefined maximum number of packet errors, and MAX_RETRY_NUMBER is a predefined maximum number of retry count. The method may further comprise monitoring by a wireless station a congestion-related metric of the wireless medium; and transmitting by the wireless station information corresponding to the congestion-related metric to an access point.

Per yet another embodiment, the present invention provides a system, comprising a network congestion monitoring agent for monitoring a congestion-related metric of a wireless medium, the congestion-related metric being based on traffic class, and for transmitting information based on the congestion-related metric to an access point; a contention-period/contention-free-period (CP/CFP) adaptation agent for receiving CP/CFP information from the access point; a point coordinator agent coupled to the CP/CFP adaptation agent for coordinating access to the wireless medium using a point coordination function based on the CP/CFP information; and a distributed coordinator module coupled to the CP/CFP adaptation agent for coordinating access to the wireless medium using a distributed coordination function based on the CP/CFP information.

DETAILED DESCRIPTION

The following description is provided to enable any person skilled in the art to make and use the invention, and is provided in the context of a particular application and its requirements. Various modifications to the embodiments are possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

Conventional IEEE 802.11e HCF protocols do not account for the access category of network traffic and/or channel conditions (interference, signal strength, etc). In one embodiment, an AP monitors network congestion (e.g., average CW, retry count, SNR, and/or other congestion-related metrics), possibly in communication with the STAs in its service set, and adaptively and dynamically adjusts the duration of the contention-free period (CFP) and/or the contention period (CP) in an HCF-based network. When the network is congested, the AP allocates more time to the CFP (during which a point coordination protocol operates) since a contention-based protocol will likely cause increased collisions. When the network is not congested, the AP allocates more time to the CP (during which a contention-based protocol operates) since a contention-based protocol has less overhead. In one embodiment, in response to the congestion state of the network, the AP adaptively and dynamically shifts traffic classes between the CP and the CFP. Traffic class shifting may operate in conjunction with CP/CFP duration adjustment. These adaptive techniques may reduce network congestion, thus improving the overall QoS performance of throughput and latency.

Figures 1A, 1B:
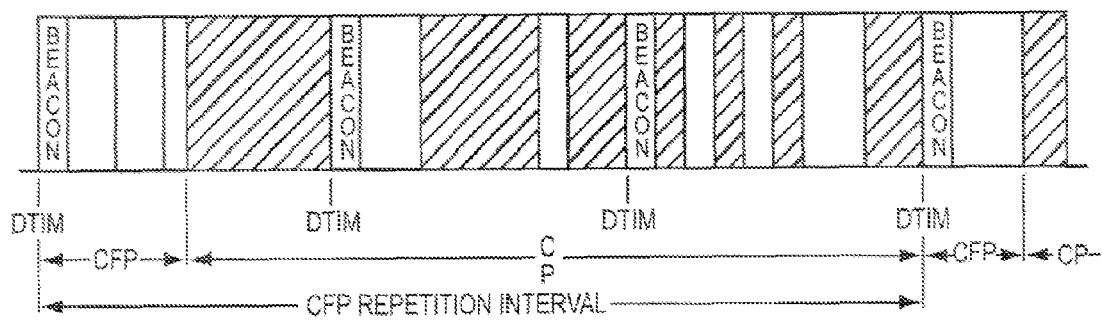
FIG. 1A is a table of a prior art EDCA access class (AC) parameter set for 802.11g.
FIG. 1B is a timing diagram illustrating prior art CP/CFP intervals.
Figure 2A:
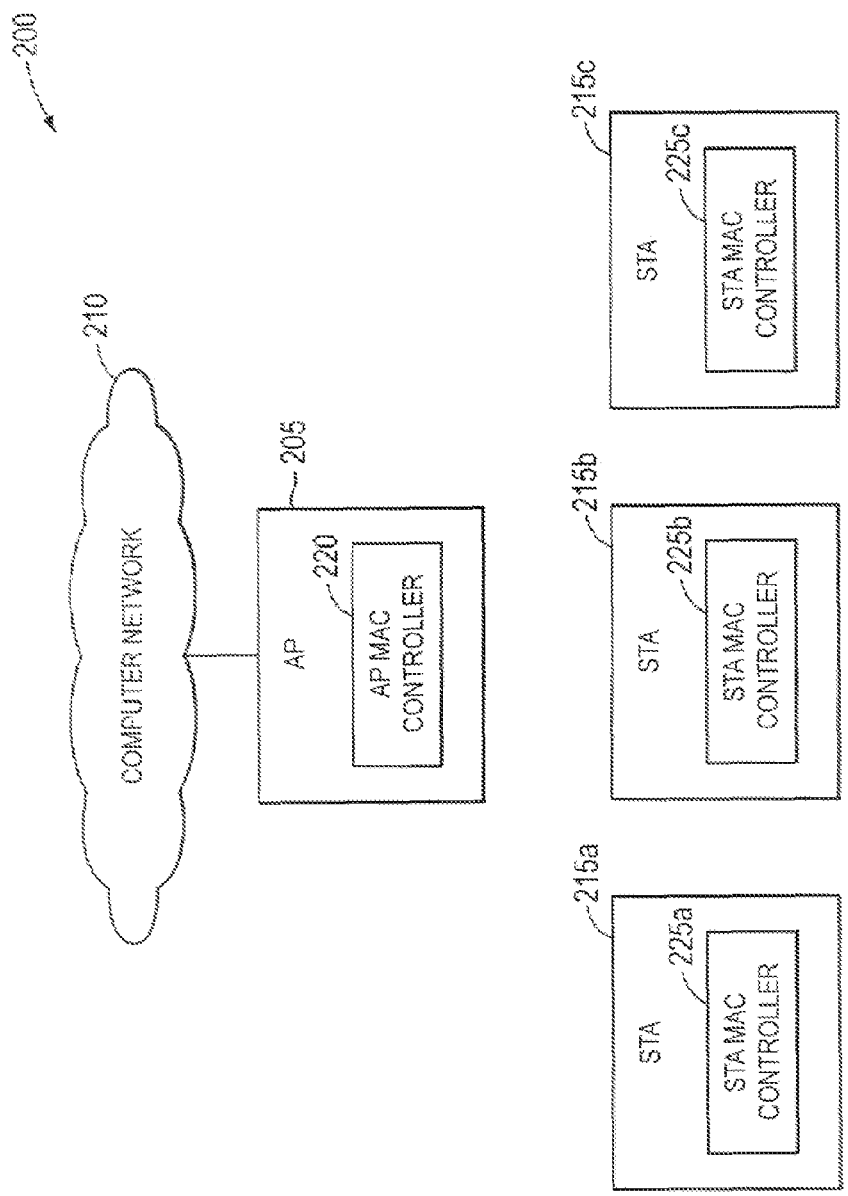
FIG. 2A is a block diagram illustrating a wireless local area network (WLAN) using CP/CFP adaptation, in accordance with an embodiment of the present invention.

FIG. 2A is a block diagram illustrating a wireless local area network (WLAN) 200 using CP/CFP adaptation with CP/CFP duration adjustment and/or traffic class shifting in accordance with an embodiment of the present invention. The WLAN 200 includes an AP 205 coupled to a computer network 210, such as the wide area network (WAN) commonly referred to as the Internet. In one embodiment, the AP 205 is coupled to the computer network 210 via a wired connection, although a wireless connection is also possible. The WLAN 200 also includes three (3) STAs, namely, STA 215a, STA 215b and STA 215c (although any number of STAs is possible). Each STA 215a, 215b, 215c is in wireless communication with the AP 205 via the wireless medium. Each STA 215a, 215b, 215c is generally referred to herein as a STA 215, although each STA 215a, 215b, 215c need not be identical.

The AP 205 includes an AP medium access control (MAC) controller 220, which includes hardware, software and/or firmware operative to control wireless access to the wireless medium by the AP 205 and to control CP/CFP adaptation by the AP 205 and the STAs 215. Details of the AP MAC controller 220 are provided with reference to FIGS. 3 and 4.

The STA 215a includes a STA MAC controller 225a; the STA 215b includes a STA MAC controller 225b; and the STA 215c includes a STA MAC controller 225c. Each STA MAC controller 225a, 225b, 225c is generally referred to herein as a STA MAC controller 225, although each STA MAC controller 225a, 225b, 225c need not be identical. Each STA MAC controller 225 includes hardware, software and/or firmware to control wireless access to the wireless medium by each STAs 215, and to control CP/CFP adaptation based on the CP/CFP information provided by the AP MAC controller 220. In one embodiment, the STA MAC controllers 225 send congestion-related metrics (e.g., average CW, retry count, SNR, and/or other congestion-related metrics) to the AP MAC controller 220 on a periodic basis, upon request, at predetermined times, upon detection of a change in performance, etc., so that the AP MAC controller 220 can evaluate current network congestion.

In one embodiment, the AP MAC controller 220 effects CP/CFP adaptation by adaptively and dynamically adjusting the duration of the CFP and the CP. When the network 200 is congested (e.g., a congestion-related metric is above a predetermined threshold), the AP MAC controller 220 allocates more time to the CFP (during which a point coordination protocol operates) since a contention-based protocol will likely cause increased collisions. When the network 200 is not congested (e.g., a congestion-related metric is below a predetermined threshold), the AP MAC controller 220 allocates more time to the CP (during which a contention-based protocol operates) since a contention-based protocol has less overhead.

In one embodiment, the AP MAC controller 220 effects CP/CFP adaptation by adaptively and dynamically shifting traffic classes between the CFP and the CP. When the network 200 is congested, the AP MAC controller 220 may shift voice packets and/or video packets (and/or other traffic classes or combinations of traffic classes) to the CFP. When the network 200 is not congested, the AP MAC controller 220 may shift voice packets and/or video packets (and/or other traffic classes or combinations of traffic classes) back to the CP. Traffic class shifting may operate in conjunction with CP/CFP duration adjustment.

When network conditions change, the AP MAC controller 220 may send updated CP/CFP information to the STA MAC controllers 225, which use the updated information to update CP/CFP adaptation, e.g., CP/CFP duration adjustment and/or traffic class shifting.

Figure 2B:
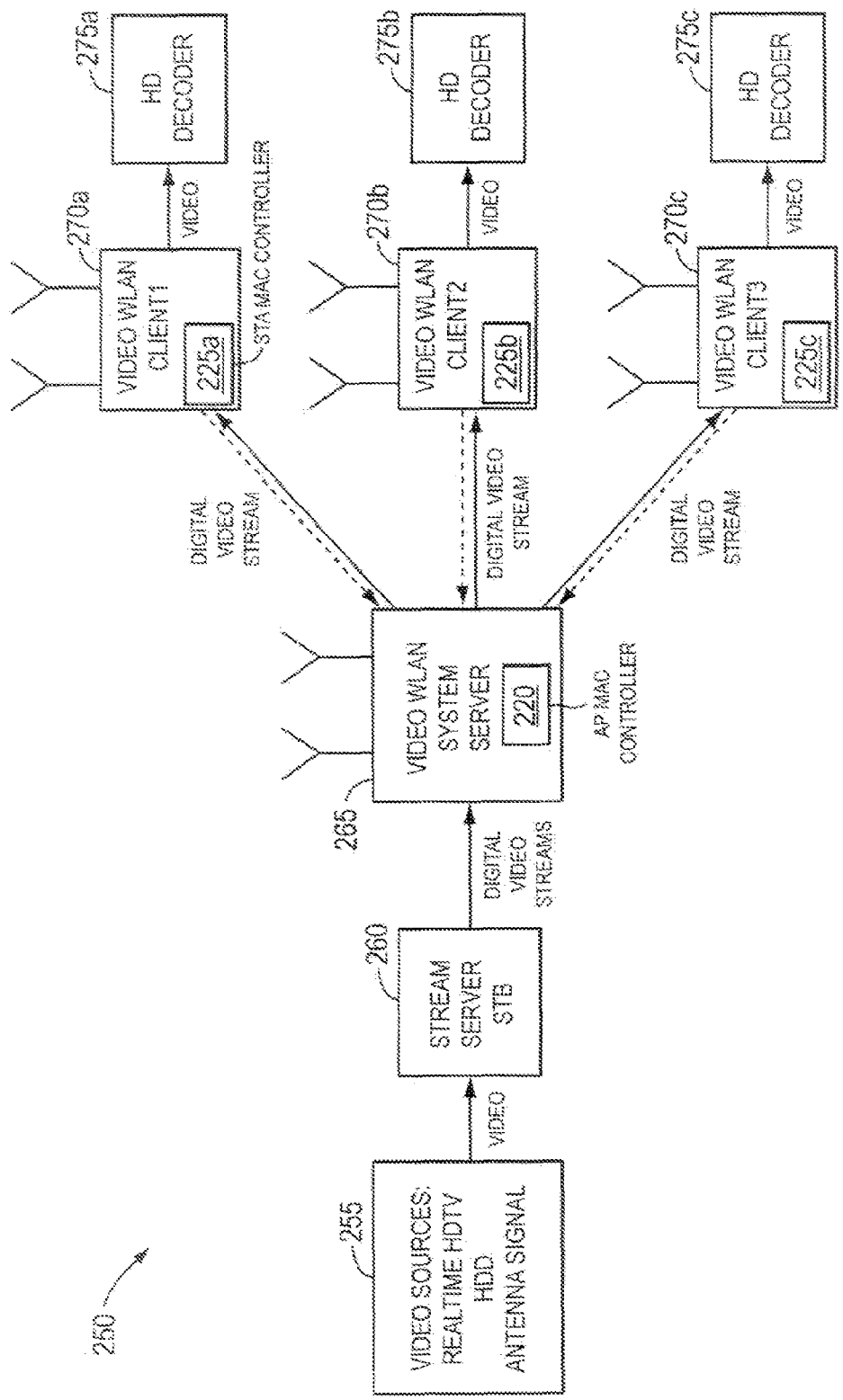
FIG. 2B is a block diagram illustrating a wireless video distribution network using CP/CFP adaptation, in accordance with an embodiment of the present invention.

FIG. 2B is a block diagram illustrating details of a video distribution network 250 incorporating CP/CFP adaptation, in accordance with an embodiment of the present invention. The video distribution network 250 includes video sources (e.g., real-time High Definition Television (HDTV) sources, hard disk drives, video transmission antennae, etc.) 255 coupled to a stream server set top box (STB) 260, which in turn is coupled to a video WLAN system server 265. The video WLAN system server 265 includes the AP MAC controller 220 incorporating CP/CFP adaptation. The video WLAN system server 265 is coupled to one or more video WLAN clients 270, in this example, to video WLAN client 270a, video WLAN client 270b and video WLAN client 270c. Each video WLAN client 270 includes a STA MAC controller 225, which cooperates with the AP MAC controller 220 to effect CP/CFP adaptation. In this example, the video WLAN client 270a includes a STA MAC controller 225a, the video WLAN client 270b includes the STA MAC controller 225b, and the video WLAN client 270c includes the STA MAC controller 225c. Further, each video WLAN client 270 is coupled to an HD decoder 275. In this example, the video WLAN client 270a is coupled to the HD decoder 275a, the video WLAN client 270b is coupled to the HD decoder 275b, and the video WLAN client 270c is coupled to the HD decoder 275c.

Generally, the video sources 255 send analog video signals to the stream server STB 260, which digitizes the analog video signals and forwards the digital video streams to the video WLAN system server 265. The AP MAC controller 220 of the video WLAN system server 265 uses an HCF protocol to send the digital video streams over the wireless medium to the video WLAN clients 270. The video WLAN clients 270 receive the transmission frames and generate video streams for the HD decoders 275 to convert to a playback signal (e.g., an HDTV signal) for presentation on video displays (e.g., television sets).

Typical application scenarios include in-flight multimedia entertainment systems (e.g., several multimedia servers serving several video clients over wireless LAN), wireless gaming (e.g., several players connected to a multimedia server over wireless LAN), and home video systems (e.g., a multimedia server serving several wireless HD TVs over wireless LAN). Other applications also exist.

It will be appreciated that an increasing number of video WLAN clients 270 may affect network congestion. Further, other clients (not video WLAN clients 270) possibly operating in the network 250 may also affect network congestion. In response, as discussed with reference to FIG. 2A, the AP MAC controller 220 and the STA MAC controllers 225 may cooperate to effect CP/CFP adaptation, including CP/CFP duration adjustment and/or traffic class shifting. By dynamically monitoring network congestion and effecting CFP/CP adaptation, it is possible to support video (e.g., HDTV video) distribution in WLAN with high throughput, low latency and low jitter.

Figure 3:
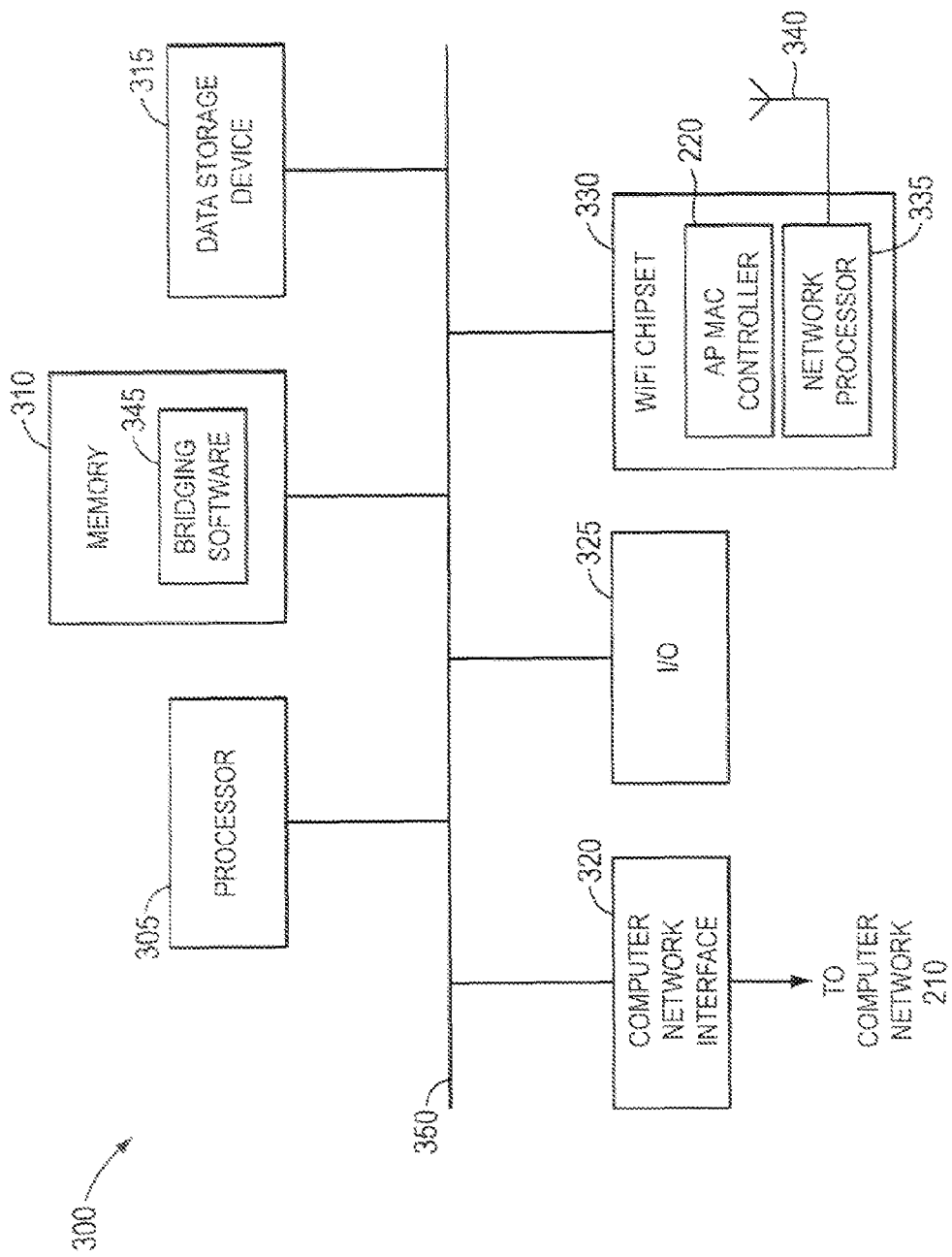
FIG. 3 is a block diagram illustrating details of an access point of FIG. 2A or FIG. 2B, in accordance with an embodiment of the present invention.

FIG. 3 is a block diagram illustrating details of an AP 300 (e.g., AP 205 or video WLAN system server 265), in accordance with an embodiment of the present invention. The AP 300 includes a processor 305 (such as an Intel Pentium® microprocessor or a Motorola Power PC® microprocessor), memory 310 (such as random-access memory), a data storage device 315 (such as a magnetic disk), a computer network interface 320, input/output (I/O) 325 (such as a keyboard, mouse and LCD display), and a WiFi chipset 330, each coupled to the communication channel 350. The computer network interface 320 may be coupled to the computer network 210. One skilled in the art will recognize that, although the memory 310 and the data storage device 315 are illustrated as different units, the memory 310 and the data storage device 315 can be parts of the same unit, distributed units, virtual memory, etc. The term "memory" herein is intended to cover all data storage media whether permanent or temporary.

The memory 310 stores bridging software 345 that enables communications between the WiFi chipset 330 and the computer network interface 320. The WiFi chipset 330 contains the AP MAC controller 220 and a network processor 335 coupled to a wireless antenna 340. Details of the AP MAC controller 220 are described below with reference to FIG. 4.

Figure 4:
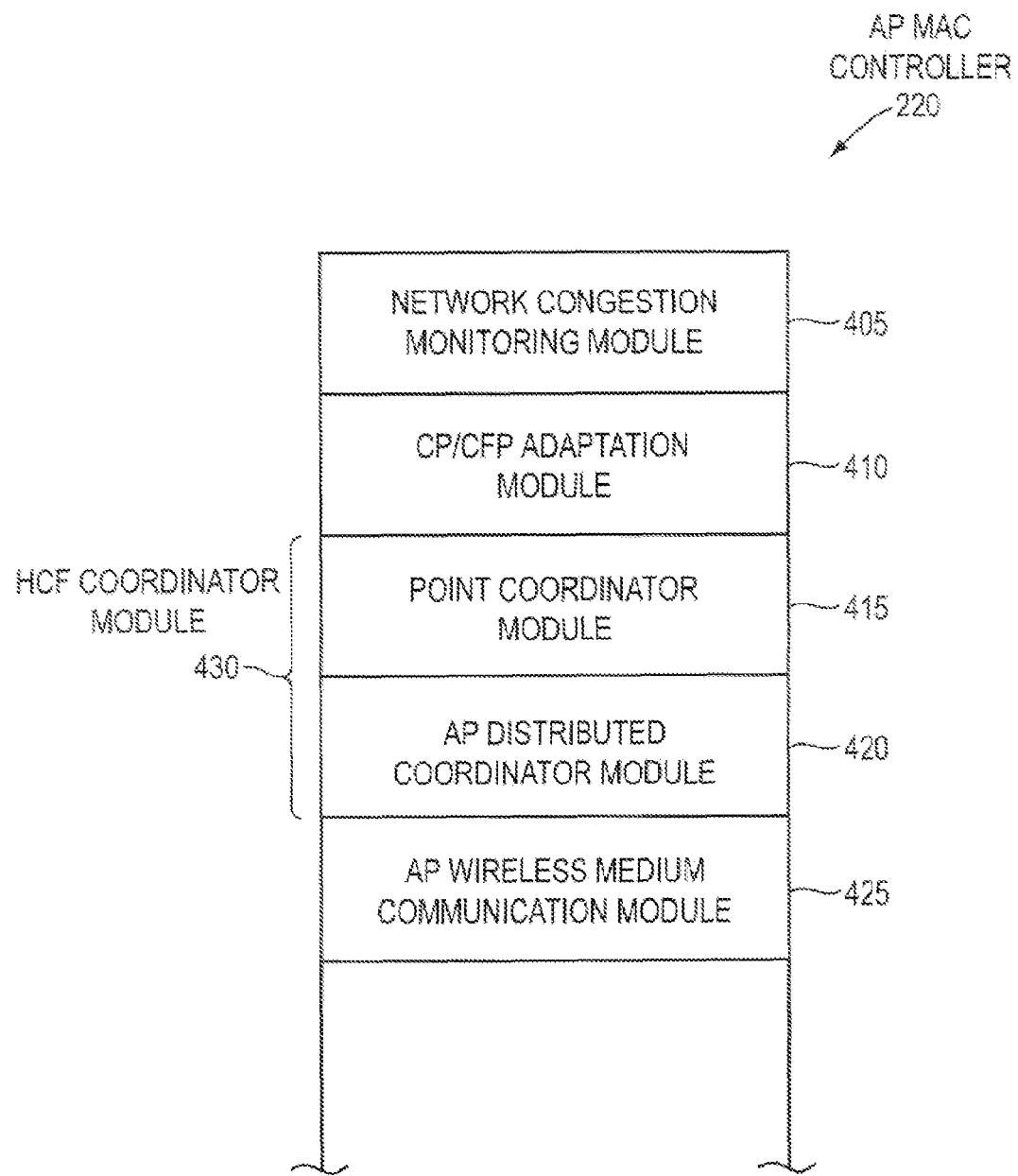
FIG. 4 is a block diagram illustrating details of an AP MAC controller of FIG. 3, in accordance with an embodiment of the present invention.

FIG. 4 is a block diagram illustrating details of the AP MAC controller 220, in accordance with an embodiment of the present invention. The AP MAC controller 220 includes a network congestion monitoring module 405, a CP/CFP adaptation module 410, a point coordinator module 415, an AP distributed coordinator module 420, and an AP wireless medium communication module 425. The point coordinator module 415 and AP distributed coordinator module 420 together form the HCF coordinator module 430.

The network congestion monitoring module 405 includes hardware, software and/or firmware that determines the congestion state of the wireless medium. In one embodiment, the network congestion monitoring module 405 defines the amount of congestion as one of two states, e.g., congested and not congested. In another embodiment, the network congestion monitoring module 405 defines the amount of network congestion as one of three or more congestion states, e.g., extremely congested, congested and not congested; or congested, okay and not congested.

In one embodiment, the network congestion monitoring module 405 determines the congestion state of the wireless medium by comparing congestion-related metrics against one or more thresholds. For example, in an embodiment where network congestion is identified as one of two states, the network congestion monitoring module 405 may identify the wireless medium as congested or not congested by applying a network congestion function based on congestion-related metrics to generate a network congestion result, and by comparing the congestion result against a predetermined congestion threshold. In an embodiment where network congestion is identified as one of three states, the network congestion monitoring module 405 may identify the state of the wireless medium by applying a network congestion function based on congestion-related metrics to generate a network congestion result, and by comparing the network congestion result against a lower and an upper threshold.

The network congestion monitoring module 405 may obtain the congestion-related metrics independently and/or from the STAs 215. Example congestion-related metrics include signal-to-noise ratio (SNR), signal strength (RSSI), average contention window size (CW_avg), retry count, etc. The network congestion monitoring module 405 may receive congestion-related metrics from the STAs 215 periodically, upon request, at predetermined times, upon detection by the STA 215 of a predetermined change, etc. The network congestion monitoring module 405 may alone monitor the congestion-related metrics or may monitor the congestion-related metrics with the STAs 215.

In one embodiment, the network congestion monitoring module 405 monitors a congestion-related metric that is based on traffic class, e.g., contention window. For example, the network congestion monitoring module 405 may determine network congestion by monitoring average CW (CW_avg). CW_avg may be an index normalized according to the function below:

$$CW\_avg = \frac{[\alpha_1 \cdot CW\_VO + \alpha_2 \cdot CW\_VI]}{[\alpha_3 \cdot CW\_BE + \alpha_4 \cdot CW\_BK]},$$

where CW_VO is the average contention window for voice traffic of substantially all STAs 215 in a service set, CW_VI is the average contention window for video traffic of substantially all STAs 215 in the service set, CW_BE is the average contention window for best effort traffic of substantially all STAs 215 in the service set, CW_BK is the average contention window for background traffic of substantially all STAs 215 in the service set, and $\alpha_1$, $\alpha_2$, $\alpha_3$ and $\alpha_4$ are weight values based on traffic class. The resulting value CW_avg computes the network congestion of high priority traffic (in this example, video and voice) compared to low priority traffic (in this example, best effort and background). A higher resulting value means that high priority traffic is in poor condition. A smaller value means the high priority traffic is in good condition.

In one embodiment, the network congestion monitoring module 405 determines network congestion by normalizing several congestion-related metrics to generate a network congestion index. The network congestion monitoring module 405 may compute a normalized weighted index of CW_avg, packet error and retry number. It will be appreciated that CW_avg is a traffic-class differentiated measurement, and that packet error and retry number are non-differentiated measurements. The network congestion index may be computed according to the function below:

$$network\_congestion\_index = $$
$$c_1 \cdot CW\_avg + c_2 \cdot \frac{packet\_error}{MAX\_ERROR} + c_3 \cdot \frac{retry\_number}{MAX\_RETRY\_NUMBER}$$
$$\sum_i c_i = 1$$

where $c_i$ is a weight value based on congestion-metric type, packet_error is an averaged number of packet errors from substantially all STAs 215/225 in a service set, retry_number is an averaged retry count from substantially all STAs 215/225 in the service set; MAX_ERROR is a predefined maximum number of packet errors, and MAX_RETRY_NUMBER is a predefined maximum number of retry count. The weight $c_i$ may be tuned by the AP MAC controller 220 to reflect the current wireless environment and QoS requirements.

The CP/CFP adaptation module 410 includes hardware, software and/or firmware that generates CP/CFP information to effect CP/CFP adaptation, e.g., CP/CFP duration adjustment and/or traffic class shifting.

In one embodiment, when network congestion increases, e.g., CW_avg>CW_threshold in a time period T1, the CP/CFP adaptation module 410 increases the CFP a number of time units and decreases the CP the same number of time units. Similarly, when network congestion decreases, e.g., a weighted summation of normalized metrics>uniform_threshold in a time period T1, the CP/CFP adaptation module 410 decreases the CFP a number of time units and increases the CP the same number of time units.

More specifically, if the network congestion metric is worse, e.g., in a time period T1, CW_avg>CW_threshold, and/or retry_number>retry_threshold, and/or SNR<SNR_threshold, or a uniformed metric>uniform threshold, then the CP/CFP adaptation module 410 increases the CFP a number (N) of time units (time_units). That is, the newCFP=oldCFP+N×time_unit. There may be CFP_min and CFP_max. If the oldCFP=CFP_max or the newCP>CP_max, then the newCFP=CP_max. Meanwhile, CP may be decreased to keep the same CFP repetition interval. Accordingly, the newCP=oldCP−N×time_unit. There may also be CP_min and CP_max. If oldCP=CP_min or the newCP<CP_min, then the newCP=CP_min. The CP/CFP adaptation module 410 notifies the STAs of the newCFP and newCP. The new CFP and CP will be effective in the next CFP Repetition Interval. Further, the CP/CFP adaptation module 410 may notify the STAs 215 to shift one or more traffic classes from EDCA mode to HCCA mode.

If the network congestion metric improves, e.g., in a time period T1, CW_avg<CW_threshold, and/or retry_number<retry_threshold, and/or SNR>SNR_threshold, and/or uniformed metric <uniform threshold, then the CP/CFP adaptation module 410 increases the CP by a number (N) of time units (time unit). The newCP=oldCP+N×time_unit. If the oldCP=CP_max or newCP>CP_max, then the newCP=CP_max. The CP/CFP adaptation module 410 decreases the CFP to keep a constant CFP repetition interval. The newCFP=oldCFP−N×time_unit. If the oldCFP=CFP_min or the newCFP<CPP_min, then the newCFP=CP_min. The CP/CFP adaptation module 410 notifies the STAs of the new CFP and the new CP. Further, the CP/CFP adaptation module 410 may notify the STAs 215 to shift traffic classes from HCCA mode to EDCA mode. The new CFP and CP will be effective in the next CFP Repetition Interval.

In a three-state embodiment, the CP/CFP adaptation module 410 may shift voice and video to the HCCA mode when network congestion is determined to be extremely congested, may shift voice and not video to the HCCA mode when network congestion is determined to be congested but not extremely congested, and may shift only part of voice and/or video traffic to the HCCA mode when network congestion is determined to be not congested. Other traffic-class shifting techniques are also possible.

The time period of network congestion monitoring, T, may be determined by the AP and can be changed by the AP at any time. The number (N) of time_units can be changed by the AP. Further, metric thresholds can be changed by AP. Enabling the AP to change these metrics, possibly based on network conditions, gives the AP additional flexibility when performing CP/CFP adaptation. Further, the number (N) of time units N may be flexible. For example, if each time_slot is 1/100 of the CFP_MAX_Duration, then N may be defined as a number between 4-10, providing a linear equation with a moderate adjustment. Alternatively, the CFP/CP adjustment may be defined as a quadratic equation, doubling or halving the old value each time.

The point coordinator module 415 includes hardware, software and/or firmware that enables access to the wireless medium during the CFP using HCCA mode. The point coordinator module 415 receives the CP and CFP duration information and/or traffic class shifting information from the CP/CFP adaptation module 410, and uses the information to effect HCCA-based point coordinated access to the wireless medium. In one embodiment, the point coordinator module 415 enables all traffic classes to access the wireless medium during the CFP according to QOS needs. In one embodiment, the point coordinator module 415 enables only specifically identified traffic classes to access the wireless medium during the CFP according to QOS needs.

The AP distributed coordinator module 420 includes hardware, software and/or firmware that enables access to the wireless medium during the CP using EDCA mode. The AP distributed coordinator module 420 receives the CP and CFP duration information and/or traffic class shifting information from the CP/CFP adaptation module 410, and uses the information to effect EDCA-based distributed coordinated access to the wireless medium. In one embodiment, the AP distributed coordinator module 420 enables all traffic classes to access the wireless medium during the CP according to EDCA parameters. In one embodiment, the AP distributed coordinator module 420 enables only specifically identified traffic classes (e.g., those not shifted to CFP/HCCA mode) to access the wireless medium during the CP.

The AP wireless medium communication module 425 includes hardware, software and/or firmware that receives transmission frames from the point coordinator module 415 and/or the AP distributed coordinator module 420 and transfers the transmission packets to the network processor 335 for transmission by the wireless antenna 340.

Figure 5:
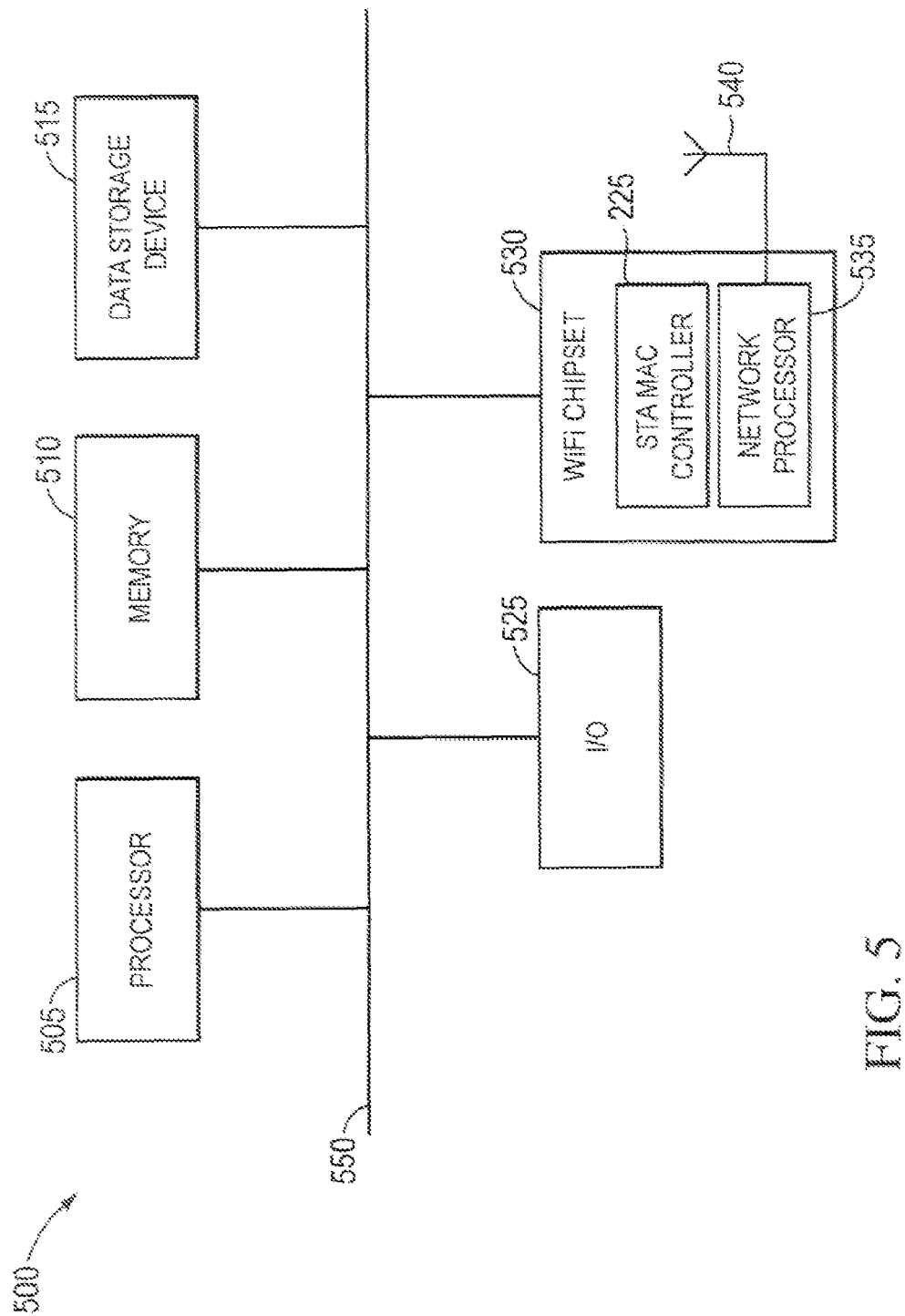
FIG. 5 is a block diagram illustrating details of a wireless station of FIG. 2A or FIG. 2B, in accordance with an embodiment of the present invention.

FIG. 5 is a block diagram illustrating details of a STA 500 (e.g., STA 215 or video WLAN client 270), in accordance with an embodiment of the present invention. The STA 500 includes a processor 505 (such as an Intel Pentium® microprocessor or a Motorola Power PC® microprocessor), memory 510 (such as random-access memory), a data storage device 515 (such as a magnetic disk), input/output (I/O) 525 (such as a keyboard, mouse and LCD display), and a WiFi chipset 530, each coupled to the communication channel 550. One skilled in the art will recognize that, although the memory 510 and the data storage device 515 are illustrated as different units, the memory 510 and the data storage device 515 can be parts of the same unit, distributed units, virtual memory, etc. The term "memory" herein is intended to cover all data storage media whether permanent or temporary.

The WiFi chipset 530 contains the STA MAC controller 225 and a network processor 535 coupled to a wireless antenna 540. Details of the STA MAC controller 225 are described below with reference to FIG. 6.

Figure 6:
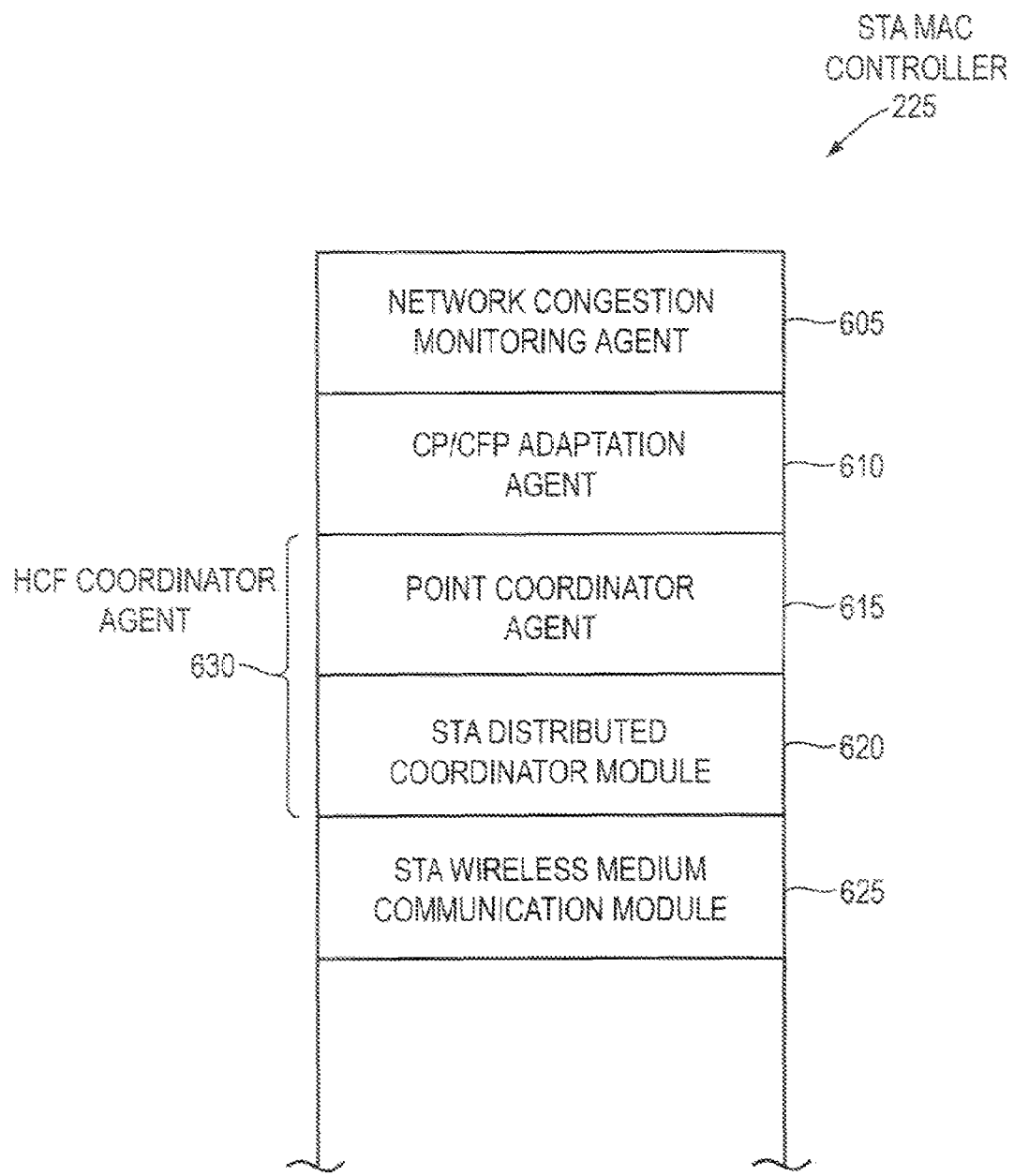
FIG. 6 is a block diagram illustrating details of a STA MAC controller of FIG. 5, in accordance with an embodiment of the present invention.

FIG. 6 is a block diagram illustrating details of a STA MAC controller 225, in accordance with an embodiment of the present invention. The STA MAC controller 225 includes a network congestion monitoring agent 605, a CP/CFP adaptation agent 610, a point coordinator agent 615, a STA distributed coordinator module 620, and a STA wireless medium communication module 625. The point coordinator agent 615 and STA distributed coordinator module 620 together form the HCF coordinator agent 630.

The network congestion monitoring agent 605 includes hardware, software and/or firmware that monitors and reports network congestion-related metrics to the network congestion monitoring module 405 of the AP MAC controller 220. As stated above, the network congestion-related metrics may include CW_avg (the average CW in a time period T) to show the number of packet collisions per traffic class; retry_number (the packet retransmission number in a time period T) to show the number of packet collisions generally; SNR (average signal to noise ratio of the channel in a time period T) to show channel interference and noise conditions; packet_error (the number of packets with errors in a time period T) to show signal strength; and/or other congestion-related metrics.

The network congestion monitoring agent 605 may report network congestion-related metrics to the network congestion monitoring module 405 periodically, upon request by the network congestion monitoring module 405, at predetermined times, upon detection of a change in one or more of the congestion-related metrics (e.g., upon detection of signal degradation below a threshold), etc.

The CP/CFP adaptation agent 610 includes hardware, software and/or firmware that receives CP and CFP duration information and/or traffic class shifting information from the CP/CFP adaptation module 410 of the AP MAC controller 220. The CP/CFP adaptation agent 610 provides the relevant information to the point coordinator agent 615 (discussed below) to effect access to the wireless medium during CFP using HCCA by the STA 215. The CP/CFP adaptation agent 610 provides the relevant information to the STA distributed coordinator module 620 (discussed below) to effect access to the wireless medium during CP using EDCA by the STA 215.

The point coordinator agent 615 includes hardware, software and/or firmware that enables access to the wireless medium during the CFP using HCCA mode. The point coordinator agent 615 receives the CP and CFP duration information and/or traffic class shifting information from the CP/CFP adaptation agent 610, and uses the information to effect HCCA-based point coordinated access to the wireless medium. In one embodiment, per the CP/CFP information, the point coordinator agent 615 enables all traffic classes to access the wireless medium during the CFP according to QOS needs as defined by the point coordinator module 415. In one embodiment, per the CP/CFP information, the point coordinator agent 615 enables only specifically identified traffic classes to access the wireless medium during the CFP according to QOS needs as defined by the point coordinator module 415.

The STA distributed coordinator module 620 includes hardware, software and/or firmware that enables access to the wireless medium during the CP using EDCA mode. The STA distributed coordinator module 620 receives the CP and CFP duration information and/or traffic class shifting information from the CP/CFP adaptation agent 610, and uses the information to effect EDCA-based distributed coordinated access to the wireless medium. In one embodiment, per the CP/CFP information, the STA distributed coordinator module 620 enables all traffic classes to access the wireless medium during the CP according to EDCA parameters. In one embodiment, per the CP/CFP information, the STA distributed coordinator module 620 enables only specifically identified traffic classes (e.g., those not shifted to CFP/HCCA mode) to access the wireless medium during the CP.

The STA wireless medium communication module 625 includes hardware, software and/or firmware that receives transmission frames from the point coordinator agent 615 and/or the STA distributed coordinator module 620 and transfers the transmission packets to the network processor 535 for transmission on the wireless antenna 540.

Figure 7:
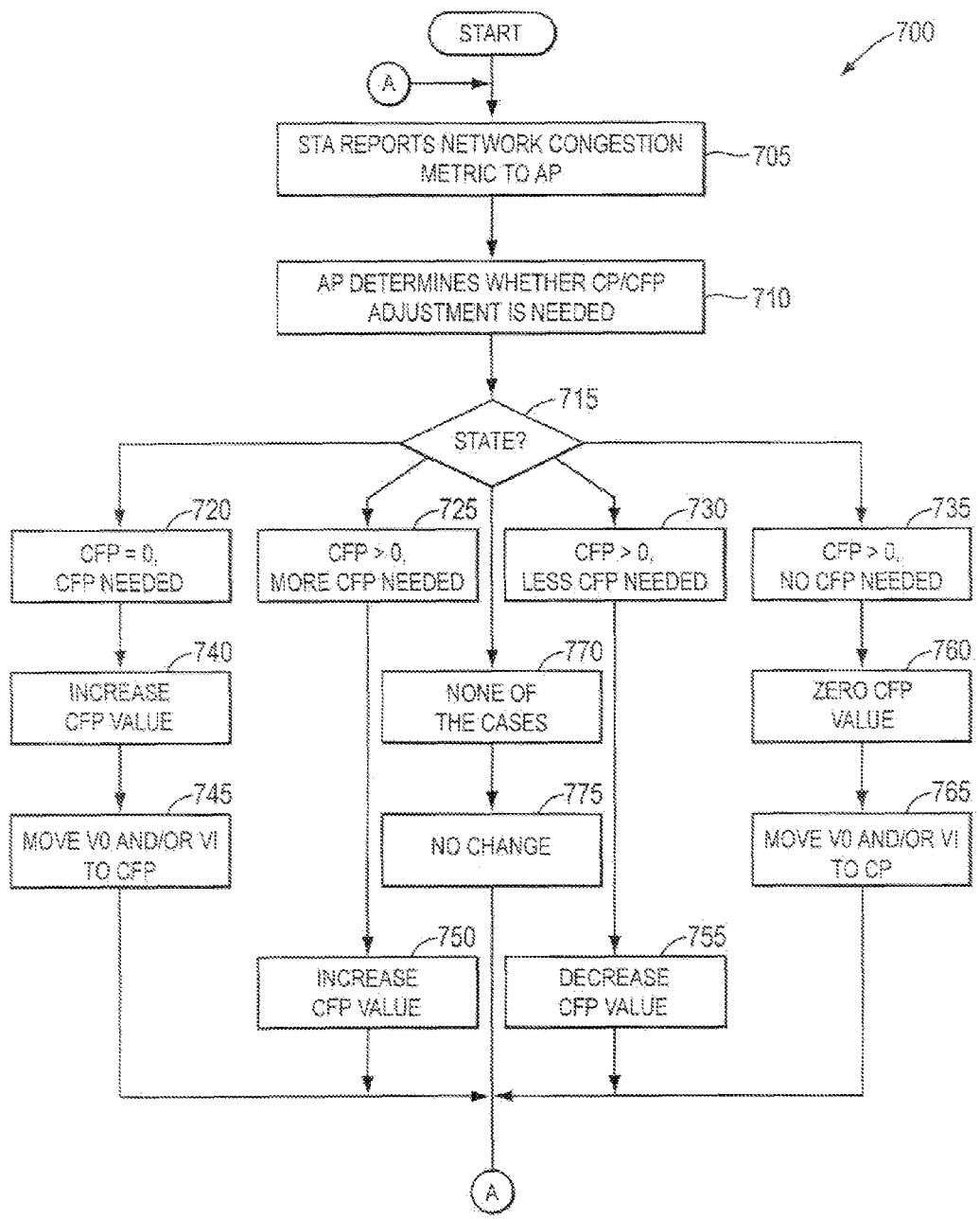
FIG. 7 is a flowchart illustrating a method of effecting CP/CFP adaptation, in accordance with an embodiment of the present invention.

FIG. 7 is a flowchart illustrating a method 700 of effecting CP/CFP adaptation, including CP/CFP duration adjustment and traffic class shifting, in accordance with an embodiment of the present invention. Upon startup, all traffic classes (BE, BK, VI, VO) are transmitted in EDCA mode. Method 700 begins with the network congestion monitoring agent 605 of each STA 215/270 in step 705 reporting congestion-related metrics to the network congestion monitoring module 405 of the AP 205/265. Step 705 may occur periodically, upon request by the AP MAC controller 220, at predetermined times, upon detection of an event such as a change in one or more congestion-related metrics, etc. In one embodiment, during a time period T, the STAs 215 in step 705 record network congestion metrics, e.g., CW for voice, video, best effort and background traffic; retry_number; packet error; etc.

The CP/CFP adaptation module 410 of the AP 205/265 in step 710 determines whether CP/CFP adjustment (e.g., duration adjustment and/or traffic class shifting) is needed. In one embodiment, the CP/CFP adaptation module 410 calculates a normalized network congestion index in time period T, and compares the network congestion index with upper and lower thresholds. In one embodiment, when the network congestion index is above the upper threshold, then the CP/CFP adaptation module 410 determines that additional CFP may be needed. When the network congestion index is below the lower threshold, then the CP/CFP adaptation module 410 determines that less CFP may be needed. When between the lower and upper thresholds, the CP/CFP adaptation module 410 may determine that no change is needed.

In one embodiment, the CP/CFP adaptation module 410 in step 715 determines the state of network congestion by identifying the state as one of four possible states, namely, state 720 where CFP=0 and CFP is needed, state 725 where CFP>0 and more CFP is needed, state 730 where CFP>0 and less CFP is needed, and state 735 where CFP>0 and no CFP is needed.

When the CP/CFP adaptation module 410 determines that network congestion is in state 720 (CFP=0 and CFP is needed), then the CP/CFP adaptation module 410 in step 740 increases the CFP duration. Further, the CP/CFP adaptation module 410 in step 745 moves a portion of one or more EDCA traffic classes or all of one or more EDCA traffic classes, e.g., all voice traffic and/or all video traffic, to the CFP to operate in HCCA mode. Method 700 then returns to step 705.

When the CP/CFP adaptation module 410 determines that network congestion is in state 725 (CFP>0 and more CFP is needed), then the CP/CFP adaptation module 410 in step 750 increases the CFP duration. Although not shown, the CP/CFP adaptation module 410 in step 750 may also move a portion of one or more EDCA traffic classes or all of one or more EDCA traffic classes, e.g., all voice traffic and/or all video traffic, to the CFP to operate in HCCA mode. Method 700 then returns to step 705.

When the CP/CFP adaptation module 410 determines that network congestion is in state 730 (CFP>0 and less CFP is needed), then the CP/CFP adaptation module 410 in step 755 decreases the CFP duration. Although not shown, the CP/CFP adaptation module 410 in step 755 may also move a portion of one or more EDCA traffic classes or all of one or more EDCA traffic classes, e.g., all voice traffic and/or all video traffic, from the CFP to the CP to operate in EDCA mode. Method 700 then returns to step 705.

When the CP/CFP adaptation module 410 determines that network congestion is in state 735 (CFP>0 and no CFP is needed), then the CP/CFP adaptation module 410 in step 760 decreases the CFP duration to zero. The CP/CFP. adaptation module 410 in step 765 moves a portion of one or more HCCA traffic classes or all of one or more HCCA traffic classes, e.g., all voice traffic and/or all video traffic, from the CFP to the CP to operate in EDCA mode. Method 700 then returns to step 705.

When the CP/CFP adaptation module 410 determines the network congestion is in state 770, where network congestion fits none of the states 720-735, the CP/CFP adaptation module 410 in step 775 makes no changes. Method 700 then returns to step 705.

It will be appreciated that the CP/CFP adaptation module 410 may adjust the length of superframe (i.e., CFP Repetition Interval). That is, if the network congestion index is over another upper threshold, larger than the one discussed with reference to step 710, the AP may for example double CFP Repetition Interval until hitting a CFP_Interval_MAX. The CP/CFP adaptation module 410 may for example double CFP_MAX_Duration and CFP_MIN_Duration. If the network congestion index is smaller than another lower threshold, smaller than the one discussed with reference to step 710, the CP/CFP adaptation module 410 may for example halve the CFP Repetition Interval until hitting CFP_Interval_MIN. The CP/CFP adaptation module 410 may for example halve CFP_MAX_Duration and CFP_MIN_Duration. Please note that, since the CFP Repetition Interval and CFP/CP duration are independent, the CFP_MAX_Duration and CFP_MIN_ Duration should have another MAX and MIN value to ensure that it does not overflow.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general-purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A system comprising:
    a network congestion monitoring module for monitoring a congestion-related metric of a wireless medium, the congestion-related metric being based on traffic class;
    a contention-period/contention-free-period (CP/CFP) adaptation module coupled to the network congestion monitoring module for generating CP/CFP information in response to the at least one congestion-related metric;
    a point coordinator module coupled to the CP/CFP adaptation module for coordinating access to the wireless medium using a point coordination function based on the CP/CFP information; and
    a distributed coordinator module coupled to the CP/CFP adaptation module for coordinating access to the wireless medium using a distributed coordination function based on the CP/CFP information;
    wherein the CP/CFP adaptation module computes a normalized contention-window metric based on the function $$\text{CW\_avg} = \frac{[a_1 \cdot \text{CW\_VO} + a_2 \cdot \text{CW\_VI}]}{[a_3 \cdot \text{CW\_BE} + a_4 \cdot \text{CW\_BK}]},$$

where CW_VO is an average contention window for voice traffic of substantially all wireless stations in a service set, CW_VI is an average contention window for video traffic of substantially all wireless stations in the service set, CW_BE is an average contention window for best effort traffic of substantially all wireless stations in the service set, CW_BK is an average contention window for background traffic of substantially all wireless stations in the service set, and a1, ct2, a3 and a4 are weight values based on traffic class.

2. The system of claim 1, wherein the system includes a video distribution system.

3. The system of claim 1, wherein the CP/CFP adaptation module controls CP/CFP duration, and the CP/CFP information specifies the CP/CFP duration.

4. The system of claim 1, wherein the CP/CFP adaptation module controls traffic class shifting, and the CP/CFP information specifies at least a portion of at least one traffic class to operate during the CFP.

5. The system of claim 4, wherein the CP/CFP adaptation module generates CP/CFP information that specifies shifting voice and video traffic classes to the CFP in response to a predetermined result of a comparison of information based on the congestion-related metric against a predetermined threshold.

6. The system of claim 4, wherein the CP/CFP adaptation module generates CP/CFP information that specifies shifting voice and video traffic classes to the CP in response to a predetermined result of a comparison of information corresponding to the congestion-related metric against a predetermined threshold.

7. The system of claim 1, wherein the congestion-related metric includes average contention window size per traffic class.

8. The system of claim 1, wherein the network congestion monitoring module monitors a plurality of congestion-related metrics including contention window size and retry count, and wherein the CP/CFP adaptation module generates a normalized network congestion index from the plurality of congestion-related metrics.

9. The system of claim 8, wherein the normalized network congestion index (network_congestion_index) is based on the function $$\text{network\_congestion\_index} = c_1 \cdot \text{CW\_avg} + c_2 \cdot \frac{\text{packet\_error}}{\text{MAX\_ERROR}} + c_3 \cdot \frac{\text{retry\_number}}{\text{MAX\_RETRY\_NUMBER}},$$

where $$\sum_i c_i = 1,$$

$c_i$ is a weight value based on congestion-metric type, packet_error is an averaged number of packet errors from substantially all wireless stations in a service set, retry_number is an averaged retry count from substantially all wireless stations in the service set; MAX_ERROR is a predefined maximum number of packet errors, and MAX_RETRY_NUMBER is a predefined maximum number of retry count.

10. The system of claim 1, further comprising one or more wireless stations coupled to the wireless medium, each station including a network congestion monitoring agent for monitoring a congestion-related metric of the wireless medium and for transmitting information corresponding to the congestion-related metric to the network congestion monitoring module.

11. A method comprising:
monitoring a congestion-related metric of a wireless medium, the congestion-related metric being based on traffic class;
generating contention-period/contention-free-period (CP/CFP) information in response to the at least one congestion-related metric;
controlling access to the wireless medium using a hybrid coordination function based on the CP/CFP information, the controlling including
coordinating access to the wireless medium using a point coordination function based on the CP/CFP information; and
coordinating access to the wireless medium using a distributed coordination function based on the CP/CFP information;
wherein the monitoring includes monitoring a plurality of congestion-related metrics including contention window size and retry count; and
the generating includes generating a normalized network congestion index from the plurality of congestion-related metrics based on the function $$\text{network\_congwestion\_index} = a_3 \cdot \text{CW\_avg} + a_2 \cdot \frac{\text{packed\_error}}{\text{MAX\_ERROR}} + a_3 \cdot \frac{\text{retry\_number}}{\text{MAX\_RETRY\_NUMBER}},$$

$$\text{where} \sum_i c_i = 1,$$

$C_i$ is a weight value based on congestion-metric type, packet_error is an averaged number of packet errors from substantially all wireless stations in a service set, retry_number is an averaged retry count from substantially all wireless stations in the service set; MAX_ERROR is a predefined maximum number of packet errors, and MAX_RETRY_NUMBER is a predefined maximum number of retry count.

12. The method of claim 11, wherein the controlling includes controlling CP/CFP duration, and the CP/CFP information specifies the CP/CFP duration.

13. The method of claim 11, wherein the controlling including controlling traffic class shifting, and the CP/CFP information specifies at least a portion of at least one traffic class to operate during the CFP.

14. The method of claim 13, further comprising comparing information based on the congestion-related metric against a predetermined threshold, and wherein the generating includes generating CP/CFP information that specifies shifting voice and video traffic classes to the CFP in response to the comparison.

15. The method of claim 13, further comprising comparing information based on the congestion-related metric against a predetermined threshold, and wherein the generating includes generating CP/CFP information that specifies shifting voice and video traffic classes to the CP in response to the comparison.

16. The method of claim 11, wherein the congestion-related metric includes average contention window size per traffic class.

17. The method of claim 16, wherein the generating includes computing a normalized contention-window metric based on the function $$CW\_avg = \frac{[\alpha_1 \cdot CW\_VO + \alpha_2 \cdot CW\_VI]}{[\alpha_3 \cdot CW\_BE + \alpha_4 \cdot CW\_BK]},$$

where CW_VO is the average contention window for voice traffic of substantially all wireless stations in a service set, CW_VI is the average contention window for video traffic of substantially all wireless stations in the service set, CW_BE is the average contention window for best effort traffic of substantially all wireless stations in the service set, CW_BK is the average contention window for background traffic of substantially all wireless stations in the service set, and $\alpha_1, \alpha_2, \alpha_3$ and $\alpha_4$ are weight values based on traffic class.

18. The method of claim 11, further comprising
monitoring by a wireless station a congestion-related metric of the wireless medium; and
transmitting by the wireless station information corresponding to the congestion-related metric to an access point.

19. A system, comprising:
a network congestion monitoring agent for monitoring a congestion-related metric of a wireless medium, the congestion-related metric being based on traffic class, and for transmitting information based on the congestion-related metric to an access point;
a contention-period/contention-free-period (CP/CFP) adaptation agent for receiving CP/CFP information from the access point;
a point coordinator agent coupled to the CP/CFP adaptation agent for coordinating access to the wireless medium using a point coordination function based on the CP/CFP information; and
a distributed coordinator module coupled to the CP/CFP adaptation agent for coordinating access to the wireless medium using a distributed coordination function based on the CP/CFP information;
wherein the CP/CFP adaptation agent computes a normalized contention-window metric based on the function $$CW\_avg = \frac{[a_1 \cdot CW\_VO + a_2 \cdot CW\_VI]}{[a_3 \cdot CW\_BE + a_4 \cdot CW\_BK]}$$

where CW_VO is an average contention window for voice traffic of substantially all wireless stations in a service set, CW_VI is an average contention window for video traffic of substantially all wireless stations in the service set, CW_BE is an average convention window for best effort traffic of substantially all wireless stations in the service set, CW_BK is an average contention window for background traffic of substantially all wireless stations in the service set, and a1, ct2, a3 and a4 are weight values based on traffic class.

* * * * *